Figure 1:
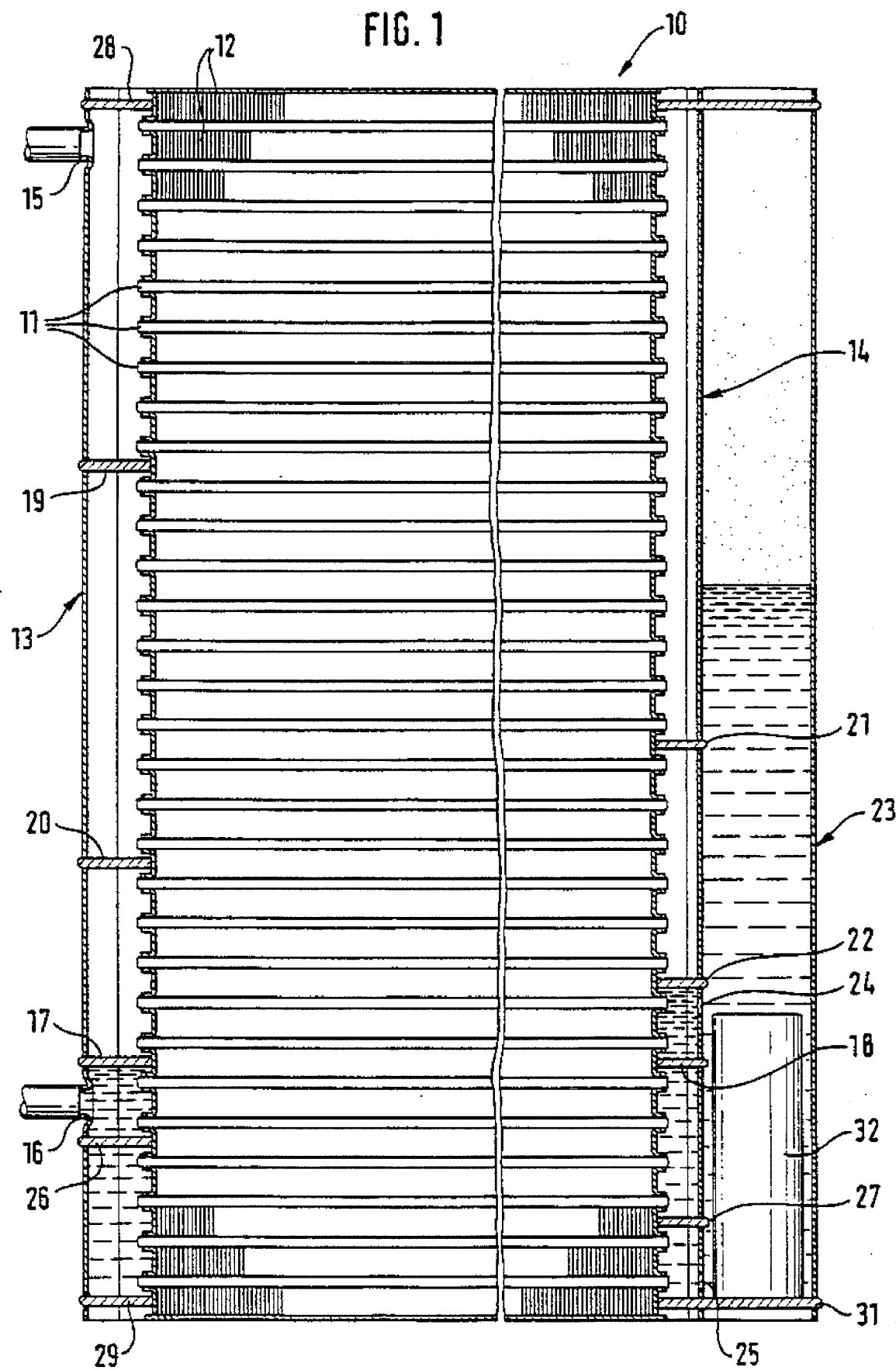

United States Patent [19]
Burk et al.

[11] Patent Number: 5,537,839
[45] Date of Patent: Jul. 23, 1996

[54] CONDENSER WITH REFRIGERANT DRIER

[75] Inventors: Roland Burk, Kornwestheim; Siegfried Tews, Stuttgart, both of Germany

[73] Assignee: Behr GmbH & Co., Stuttgart, Germany

[21] Appl. No.: 325,179
[22] PCT Filed: Nov. 3, 1993
[86] PCT No.: PCT/EP93/03078
   § 371 Date: Apr. 24, 1995
   § 102(e) Date: Apr. 24, 1995
[87] PCT Pub. No.: WO94/11686
   PCT Pub. Date: May 26, 1994

[30] Foreign Application Priority Data

Nov. 18, 1992 [DE] Germany .................. 42 38 853.8

[51] Int. Cl.⁶ .................................................. F25B 43/00
[52] U.S. Cl. ........................ 62/474; 62/509; 165/132; 165/DIG. 354
[58] Field of Search ..................... 62/474, 509, 512; 165/110, 132, DIG. 354

[56] References Cited

U.S. PATENT DOCUMENTS 5,159,821 11/1992 Nakamura ........................... 165/132
5,224,358 7/1993 Yamanaka et al. ................... 62/509

FOREIGN PATENT DOCUMENTS 4254171 9/1992 Japan ..................................... 62/509

Primary Examiner—John M. Sollecito
Attorney, Agent, or Firm—Foley & Lardner

[57] ABSTRACT

In a condenser for a vehicle air-conditioning system having a pipe-rib block (10) provided on both sides with collecting pipes (13, 14) which are divided by means of partitions (17, 18) into an upper condensing portion for gaseous refrigerant and a lower supercooling portion for liquid refrigerant, there is disposed parallel to a collecting pipe (14) a collector (23), which is connected by a first connecting opening (24) to the condensing portion and by a second connecting opening (25) to the supercooling portion.

8 Claims, 4 Drawing Sheets

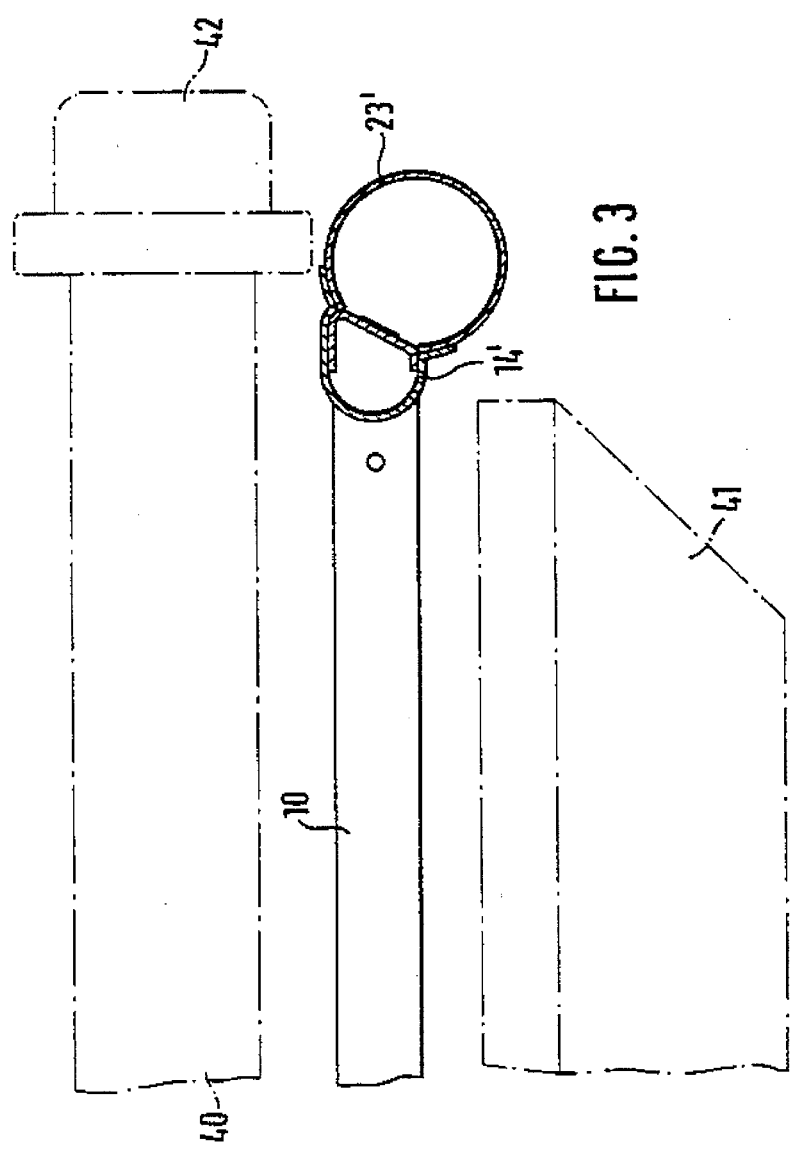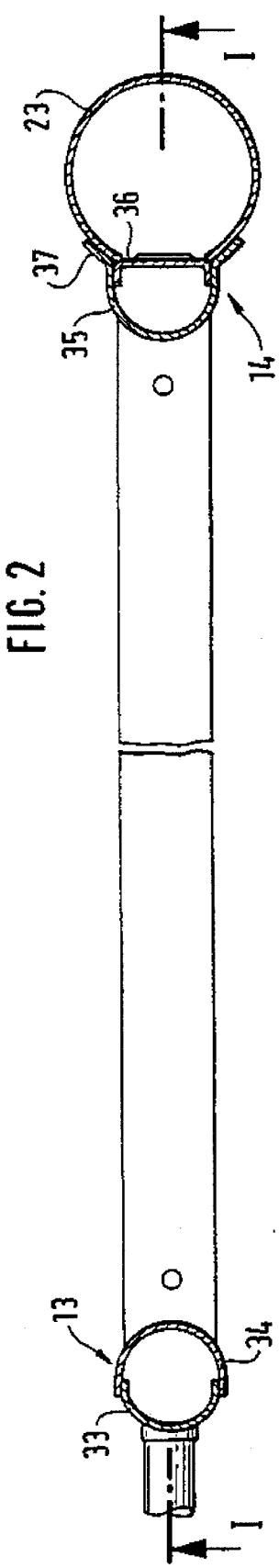

5,537,839

CONDENSER WITH REFRIGERANT DRIER

The invention relates to a condenser for a vehicle air-conditioning system, which condenser contains a pipe-rib block provided on both sides with collecting pipes which are divided by means of partitions in such a way that the pipe-rib block forms an upper condensing portion for gaseous refrigerant and a lower supercooling portion for liquid refrigerant, between which, paralled to a collecting pipe, there is disposed a collector.

In a known condenser of the type stated in the introduction (EP 0 480 330 A2), the collector, which serves as a type of intermediate store for liquid and gaseous refrigerant, is connected up to a connecting line between the condensing portion and the supercooling portion.

The object of the invention is to configure a condesner of the type stated in the introduction such that a relatively large design scope exists with regard to the configuration of the condensing portion and, in particular, of the supercooling portion.

This object is achieved, in a condenser of the generic type, by virtue of the features of claim 1.

The arrangement of the collector, which is connected by respectively dedicated connecting openings to the condensing portion and the supercooling portion, allows for greater design scope. In particular, it is possible to design the supercooling portion within the condenser such that the liquid coolant is fed to the supercooling section in the region of the lower end of the condenser, so that the liquid coolant, en route to an outlet socket, flows through the condenser from the bottom upward with a plurality of counter-running motions. The design of the collecting pipe having the parallel collector as a double pipe, in whose wall separating the two pipe chambers the connecting openings are placed, produces an extremely compact construction containing no junctions or connecting points which have to be outwardly sealed.

In a first embodiment, it is envisaged that the double pipe is joined together from at least two sheet-metal profiles.

In another embodiment of the invention, it is envisaged that the double pipe is composed of sheet-metal profiles and an extruded connecting profile. In both embodiments, a pre-assembly is initially carried out and then the individual elements are soldered together in a furnace.

In a further embodiment of the invention, it is envisaged that the double pipe is an extruded twin-chamber pipe.

In a further design of the invention, it is envisaged that the pipe chamber which serves as a collector is arranged offset relative to the plane of the pipe-rib block. This offset arrangement can give rise to considerable installation advantages, especially where the condenser is disposed between a fan guard and a radiator for the vehicle engine liquid in the engine compartment, in which there is usually only a small amount of construction space available.

Figure 4:
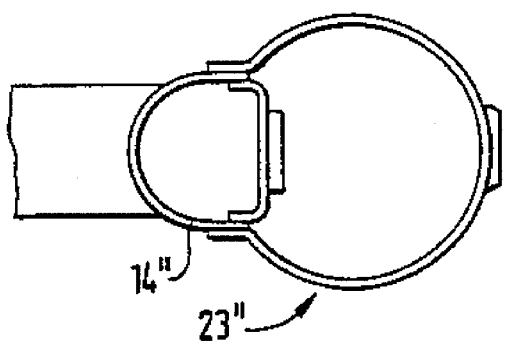
Figure 5:
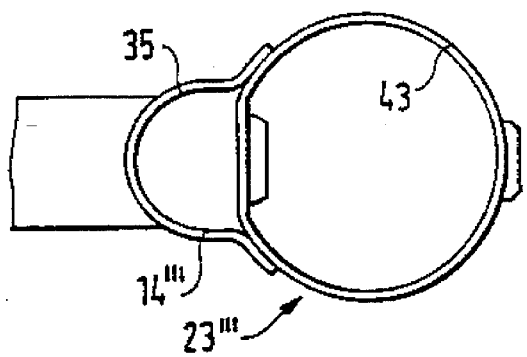
Figure 6:
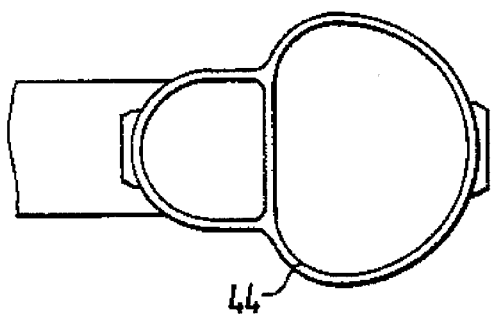
Figure 7:
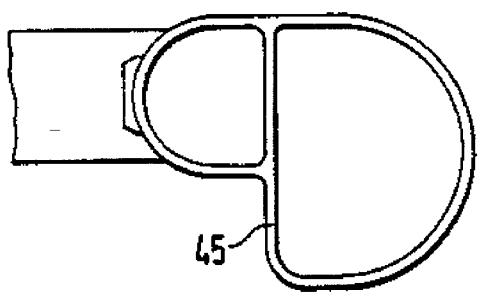
Figure 8:
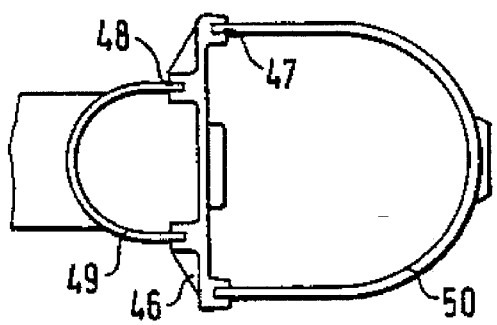
Figure 9:
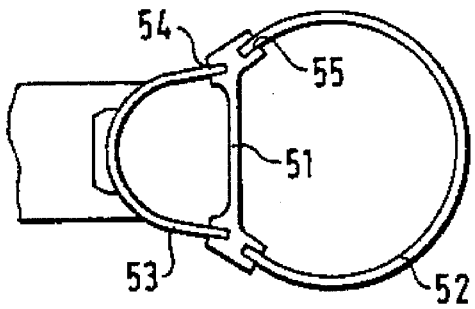
Figure 10:
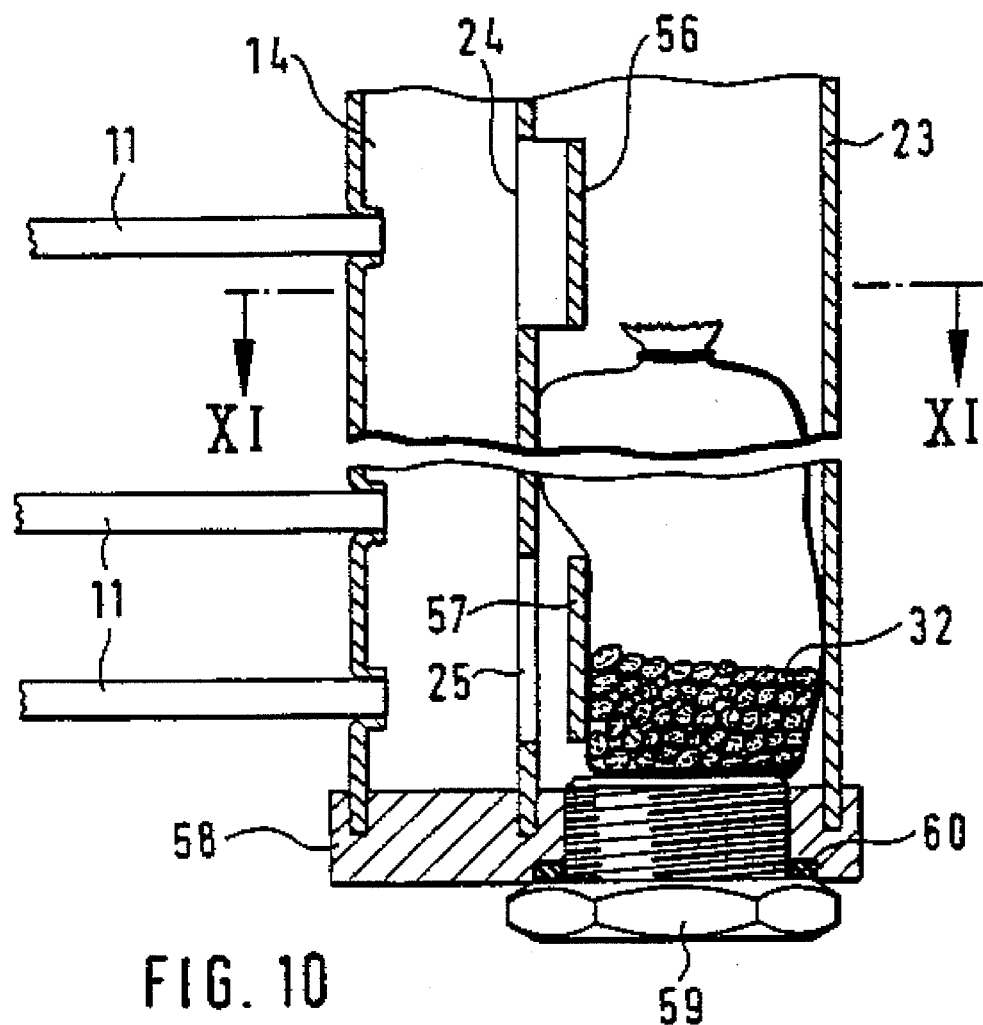
Figure 11:
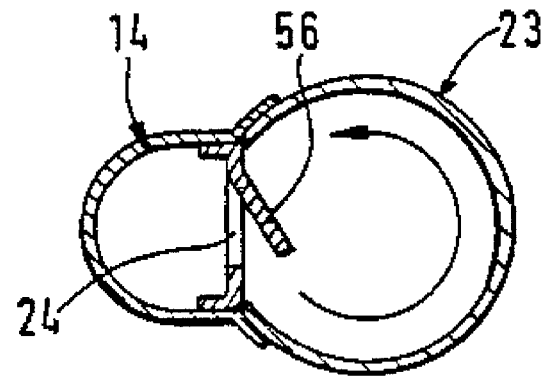

Further features and advantages of the invention derive from the following description of the embodiment represented in the drawing, in which:

FIG. 1 shows a vertical section (along the line I—I of FIG. 2) through a condenser according to the invention, FIG. 2 shows a top view of the condenser of FIG. 1, FIG. 3 shows a top view of a modified embodiment of a condenser according to the invention, exhibiting its position, in which it is installed in a motor vehicle, relative to further elements, FIGS. 4 and 5 show modified embodiments for a double pipe which is composed of sheet-metal profiles and serves as collecting pipe and collector, FIGS. 6 and 7 show projections of double pipes which serve as collecting pipe and collector and are manufactured as extruded pipes, FIGS. 8 and 9 show top views of the double pipes serving as collecting pipe and as collector, respectively comprising a connecting profile and sheet-metal profiles fastened thereto, FIG. 10 shows a vertical part-section through the lower region of a modified embodiment of a condenser with integrated collector, and FIG. 11 shows a cross section through collecting pipe and collector in the region of a connecting opening.

The condenser represented in FIGS. 1 and 2 possesses a pipe-rib block 10 having horizontally lying flat pipes 11 and ribs 12 disposed therebetween. The flat pipes 11 emerge in collecting pipes 13, 14, which run on both sides over the entire height of the pipe-rib block 10. The left collecting pipe 13 in the drawing is provided with an intake socket 15 for the gaseous refrigerant emanating from a compressor. The same collecting pipe 13 is additionally provided with a socket 16 for a line via which liquid refrigerant is transported to an expansion valve.

The two collecting pipes 13, 14 are divided in the vertical direction by partitions 17, 18, which divide the pipe-rib block 10 into an upper condensing portion for the condensing gaseous refrigerant and a supercooling portion for the already liquid refrigerant. The two partitions 17, 18 are at the same height. The collecting pipes 13, 14 are divided, in the condensing portion lying above the partitions 17, 18, by means of further intermediate partitions 19, 20; 21, 22, such that the gaseous refrigerant describes a meandering path in the condensing portion, in which case as the cooling increases the flow area is reduced which corresponds to the reduction in volume of the gaseous refrigerant occurring during this process.

To one of the collecting pipes (in the drawing, to the right collecting pipe 14) there is connected a collector 23, which is connected by a connecting opening 24 to the lower outlet region of the condensing portion. In the collector 23, liquid refrigerant collects up to a certain level. Above this level there is gaseous refrigerant. The effect of the collector 23, by virtue of its function as a steam separator and fill-quantity reservoir, is that the state of the refrigerant passing from the connecting opening 24 into the collector 23 is essentially saturated, i.e. the refrigerant is already at that point, therefore, fully condensed.

The collector 23 is connected by a connecting opening 25 in the region of the base to the supercooling portion, in which liquid refrigerant is supercooled. The collecting pipes 13, 14 are divided in the supercooling portion by a respective intermediate partition 26, 27, thereby producing a Z-shaped flow path for the liquid refrigerant from the connecting opening 25 to the outlet socket 16.

The collecting pipes 13, 14 are closed off at the top and bottom by extremity walls 28, 29, 30, 31. The extremity walls 30, 31 of the collecting pipe 14 also form at the same time the upper and lower extremity walls for the tubular collector 23 attached to the collecting pipe 14.

As is represented in FIG. 1, within the collector 23 there is disposed a dryer cartridge 32. In the illustrative embodiment according to FIG. 1, the dryer cartridge 32 is not removable from the collector 23. In a modified embodiment, it is envisaged that the sealing wall 31, i.e. the base of the collector 23, is provided with a threaded connecting branch into which a cover corresponding to the diameter of the dryer cartridge 32 is screwed in a seal-forming manner. In this embodiment, the dryer 32 can then be removed from the collector and exchanged.

In the illustrative embodiment according to FIGS. 1 and 2, the left collecting pipe in the drawing comprises two sheet-metal profiles 33, 34 of roughly semi-oval cross section, the edges of which overlap.

The right collecting pipe 14 in the drawing is also composed of two sheet-metal profiles 35, 36, which mutually overlap. The sheet-metal profile 35 is provided with extended edges 37 forming flange faces for the collector 23, said collector consisting of an essentially cylindrically bent sheet-metal profile.

The entire condenser is constructed such that it can be pre-assembled in the previously described form, the individual elements already holding together in positive or non-positive locking arrangement. In this fitted-together or pre-assembled shape, the condenser is put into a soldering furnace, in which the individual elements are soldered together and hence a permanent and seal-tight connection created between them. To this end, the individual elements are provided in a known manner with a solder plating.

In motor vehicles it is the general norm that, as represented in FIG. 3, a condenser should be disposed, in the direction of travel, in front of a radiator 40 for the engine coolant. In front of the condenser there is then located a further blower having a fan guard 41. In the embodiment according to FIG. 3, the collector 23' is attached to the collecting pipe 14' in such a way that it is offset relative to the plane of the pipe-rib block 10. It is thereby possible to fit the tubular collector 23' to the collecting pipe 14', without the previous installation dimensions having to be altered. It is also possible, of course, in this case to arrange the collector 23' such that it is twisted still further in the clockwise direction relative to the collecting pipe 14', thereby enabling the pipe-rib block 10 with the collecting pipe 14 to be moved yet tighter against the radiator 40. It is additionally possible to provide the collector 23', with a contour which surrounds, at a distance, the indicated water tank 42 of the radiator.

In the embodiment according to FIG. 4, it is envisaged that the collecting pipe 14" with the formed-on collector 23" is composed, similarly to FIG. 1, of three sheet-metal profiles. In this embodiment, however, the sheet-metal profile forming the collector 23" is provided with chamfered tabs, which attach to the collecting pipe 14" from outside and are there soldered to it in a seal-forming manner.

In the embodiment according to FIG. 5, it is envisaged that the collecting pipe 14''' and the collector 23''' are formed purely from two sheet-metal profiles 35 and 43. The sheet-metal profile 35 corresponds in its shape to the sheet-metal profile 35 used in FIGS. 1 and 2. The sheet-metal profile forming the collector 23''' is a closed pipe 43 exhibiting a flattening in the region facing the collecting pipe 14'''. It is also possible, of course, to use a completely cylindrical pipe or even a rectangular or square or otherwise shaped pipe.

In the embodiment according to FIG. 6, an extruded double pipe 44 is provided, which forms with one pipe chamber a collecting pipe and with another pipe chamber the collector.

As is represented in FIG. 7, a double pipe 45 can be provided, which exhibits an asymmetrical profile where this is advantageous for installation reasons.

In the embodiment according to FIG. 8 there is provided an extruded intermediate profile 46, which is provided with vertically running receiving slots 47, 48 into which the edges of roughly semi-oval sheet-metal profiles 49, 50 are inserted, forming a collecting pipe and a collector.

The same principle according to FIG. 8 is also envisaged in the illustrative embodiment according to FIG. 9, i.e. by means of an extruded connecting profile 51 two sheet-metal profiles 52, 53 are joined together, forming a collecting pipe and a collector. The connecting profile 51 is provided with vertically running receiving slots 54, 55 into which the edges of the sheet-metal profiles 52, 53 are inserted.

As has already been mentioned, the spaced-apart connecting openings 24, 25 between the collecting pipe 14 and the collector 23 ensure that the collector is flowed through by the coolant. In Order to ensure that, as far as possible, the supercooling portion receives only liquid coolant from the connecting opening 25, the collector 23 must also fulfill, in the best possible manner, the function of a liquid separator. The effect of the collector 23 then consists in a different liquid state, depending upon the operating state, developing in the collector 23, which liquid state influences the condensation pressure and hence the associated condensation temperature such that the state of the refrigerant feeding through the connecting opening 24 into the collector 23 is likewise, by and large, liquid in all operating states. The slim construction of the collector 23, due to high flow velocity of the refrigerant mass-flow in the collector 23 from the connecting opening 24 to the connecting opening 25, can result in gas bubbles being able to be entrained downward, thereby impairing the intended, optimal phase separation and hence the separation of the condenser module into condensation portion and supercooling portion. In order to prevent this, it is envisaged according to the illustrative embodiment according to FIG. 10 and FIG. 11 that the connecting opening 24 is designed such that it produces an eddy of liquid, whereby the heavier liquid components of the refrigerant mass-flow move outward and then flow downward against the inner walling, while the lighter gas components remain in the center and migrate upward. To this end, the connecting opening 24 is configured as a punched opening, from which a tab 56 serving as a guide means is folded out. The tab 56 is directed toward the adjoining inner walling of the collector 23, so that the refrigerant flows with an eddy into the collector. In the represented illustrative embodiment, the collector 23 possesses an essentially cylindrical cross section, the tab being directed approximately tangentially.

As is represented in FIG. 10, it is possible to configure in corresponding fashion the lower connecting opening 25 through which refrigerant flows from the collector 23 to the supercooling portion. Expediently, it is envisaged here that the tab 57 is folded out in the counter-direction, so that the liquid refrigerant runs off with a same-directional flow.

As is further represented in FIG. 10, the collecting pipe 14 and the collector 23 adjoining thereto are closed off by means of a common cover 58, which is provided with slots corresponding to the contours of the collecting pipe 14 and collector 23, so that this cover 58 is placed onto the ends of the collecting pipe 14 and collector 23 and is soldered thereto. In the region of the collector 23, the cover 58 is provided with a threaded bore into which a stopper 59 is screwed. Between the stopper 59 and the cover 58 there is inserted a sealing ring 69, in particular an O-ring. The dryer 32 consists of dry granulate filled into a bag. This dryer, once the stopper 59 is released, is able to be exchanged. Expediently, the dryer is held in the axial direction for such a short length of time that it fails to reach into the region of the connecting opening 24, so that the eddying in the collector 23 is not prevented there by the dryer 32.

We claim:

1. Condenser for a vehicle air-conditioning system, which condenser contains a pipe-rib block provided on both sides with collecting pipes which are divided by means of partitions in such a way that the pipe-rib block forms an upper condensing portion for gaseous refrigerant and a lower supercooling portion for liquid refrigerant, between which, parallel to the collecting pipe, there is disposed a collector, characterized in that the collecting pipe (14) and the collector (23) parallel thereto are configured as a double pipe, in whose wall separating the two pipe chambers two connecting openings (24, 25) are placed at a distance apart, and on a base (31, 58) of the collector (23) there is disposed a dryer (32), which extends at least as far as the first connecting opening (24) connecting the collector (23) to the condensing portion, and the collector (23) is connected by the second connecting opening (25), which is placed in the region of the base (31, 58), to the supercooling portion.

2. Condenser according to claim 1, characterized in that the double pipe is joined together from at least two sheet-metal profiles (35, 36, 38, 43).

3. Condenser according to claim 1, characterized in that the double pipe is composed of sheet-metal profiles (49, 50, 52, 53) and an extruded connecting profile (46, 51).

4. Condenser according to claim 1, characterized in that the double pipe is an extruded twin-chamber pipe (44, 45).

5. Condenser according to claim 1, characterized in that the pipe chamber which serves as a collector (23') is arranged offset relative to the plane of the pipe-rib block (10).

6. Condenser according to claim 1, characterized in that at least the first connecting opening (24), running from the condenser portion to the collector (23), exhibits an outlet having a form which generates a flow eddy in the collector.

7. Condenser according to claim 6, characterized in that the outlet of the connecting opening (24) is provided with a guide element (56), which is directed toward a wall of the collector adjoining the connecting opening.

8. Condenser according to claim 1, characterized in that the base is formed by an end-side cover (58) which is provided with a threaded bore and in which there is disposed a stopper.

\* \* \* \* \*